UNITED STATES PATENT OFFICE.

WILLIAM C. HORNER, OF INDIANAPOLIS, INDIANA.

ART OF BAKING.

1,044,179.      Specification of Letters Patent.      Patented Nov. 12, 1912.

No Drawing.      Application filed December 11, 1911.    Serial No. 664,966.

*To all whom it may concern:*

Be it known that I, WILLIAM C. HORNER, a citizen of the United States, residing at Indianapolis, in the county of Marion and State of Indiana, have invented a new and useful Improvement in the Art of Baking, of which the following is a specification.

It has for many years been customary to mark bread, and other baked food products, especially those made from cereals, by attaching thereto a gummed label but such practice is now being condemned as unsanitary.

The object of my present invention is, therefore, to provide an improvement in the production of such goods by which they may be satisfactorily branded in sanitary and attractive manner.

In the practice of my invention, the uncooked goods are produced in any ordinary and desired manner and when in condition for introduction into the oven or other cooker, the article is subjected to the searing, or local cooking, action of a heated brand of desired outline and ornamentation. By this means the material of the article which has been acted on by the brand assumes a permanent, or practically permanent, shape which is not later distorted. The branded article is then subjected to the ordinary cooking action for which it has been designed, and the finished product bears the desired brand which, having been preliminarily cooked, is not materially altered by the further cooking action.

In the case of bread, made from wheat flour, I have found that, after the dough has been formed into a loaf, a heated brand (as, for instance, a brand made to be electrically heated by passage of current through wires forming the desired pattern of the brand,) may be pressed lightly against the dough which will conform to the surface of the brand and quickly become locally cooked, so that the affected portions of the dough will be sufficiently stiff to resist distortion as the loaf expands under the subsequent cooking which, while properly browning the rest of the loaf, does not burn or char the previously cooked brand.

By the above described operations, I am able to satisfactorily brand food products in an entirely sanitary and attractive manner.

I claim as my invention:

1. That improvement in the art of producing bread which comprises branding the dough by locally applied heat, and subsequently baking the branded dough.

2. That improvement in the art of producing cooked cereal foods, which comprises branding the dough by locally applied heat, and subsequently cooking the branded dough.

In witness whereof, I, have hereunto set my hand and seal at Indianapolis, Indiana, this 28th day of November, A. D. one thousand nine hundred and eleven.

WILLIAM C. HORNER. [L. S.]

Witnesses:
 FRANK A. FAHLE,
 G. B. SCHLEY.

---

Copies of this patent may be obtained for five cents each, by addressing the "Commissioner of Patents, Washington, D. C."